United States Patent [19]

Boyer

[11] Patent Number: 5,754,113
[45] Date of Patent: May 19, 1998

[54] CIRCUIT MONITOR FOR PLURAL ELECTRICAL SWITCHING APPARATUS

[75] Inventor: William S. Boyer, Lincoln, Ill.

[73] Assignee: Eaton Corporation, Cleveland, Ohio

[21] Appl. No.: 740,182

[22] Filed: Oct. 28, 1996

[51] Int. Cl.⁶ ............................................. G08B 21/00
[52] U.S. Cl. ........................... 340/638; 340/639; 335/17
[58] Field of Search .................. 340/638, 639, 340/693, 635, 825.06, 825.16; 335/17, 18, 14

[56] References Cited

U.S. PATENT DOCUMENTS

| | | | |
|---|---|---|---|
| 4,553,115 | 11/1985 | Grunert et al. | 335/14 |
| 4,556,882 | 12/1985 | Brifman et al. | 340/638 |
| 4,558,306 | 12/1985 | Freliech | 340/648 |
| 4,642,726 | 2/1987 | Matsko et al. | 361/198 |
| 4,654,614 | 3/1987 | Chien et al. | 335/201 |
| 4,698,621 | 10/1987 | Masot | 340/638 |
| 4,918,566 | 4/1990 | Brodsky et al. | 361/166 |
| 4,945,345 | 7/1990 | Proctor et al. | 340/638 |
| 5,233,330 | 8/1993 | Hase | 340/638 |
| 5,291,165 | 3/1994 | Whipple et al. | 335/18 |
| 5,343,192 | 8/1994 | Yenisey | 340/638 |
| 5,469,000 | 11/1995 | Geysen | 307/39 |
| 5,493,278 | 2/1996 | Mckenzie et al. | 340/638 |

*Primary Examiner*—Brent A. Swarthout
*Assistant Examiner*—Van T. Trieu
*Attorney, Agent, or Firm*—Martin J. Moran

[57] ABSTRACT

A monitoring apparatus includes sensors for interconnection with the load output terminal of a corresponding circuit breaker. The sensors sense the closed and open states of the corresponding circuit breakers and produce closure signals at outputs. The sensor outputs are interconnected in series to produce a combined closure signal for all of the circuit breakers. An indicating circuit interconnected with the combined closure signal outputs a signal, such as a relay contact or an audible, visual, or digital signal, to indicate the combined closure status of the circuit breakers.

8 Claims, 4 Drawing Sheets

5,754,113

CIRCUIT MONITOR FOR PLURAL ELECTRICAL SWITCHING APPARATUS

BACKGROUND OF THE INVENTION

1. Field of the Invention

This invention relates to monitoring of electrical switching apparatus and, more particularly, to monitoring of plural electrical switching apparatus, such as circuit breakers.

2. Background Information

Electrical switching devices include, for example, circuit switching devices and circuit interrupters such as circuit breakers, contactors, motor starters, motor controllers, lighting controllers, ground fault circuit interrupters (GFCI), other load controllers, and other electromechanical switching devices used for controlling a variety of electrical loads. Circuit breakers are generally used to protect electrical circuitry from damage due to an overcurrent condition, such as an overload fault or a relatively high level short circuit condition. Molded case circuit breakers, for example, include at least one pair of separable contacts which may be operated either manually by way of a handle disposed on the outside of the case or automatically in response to an overcurrent condition. In the automatic mode of operation, a trip unit controls an operating mechanism which opens the separable contacts. In the manual mode of operation, the handle, for example, cooperates with the operating mechanism in order to open the separable contacts. Examples of circuit breakers are disclosed in U.S. Pat. Nos. 4,553,115; 4,642,726; and 4,654,614.

Electrical switching devices may optionally include an auxiliary connection or an auxiliary switch located therein to externally indicate the status of the device. Such an auxiliary connection may include, for example, a connection from an internal auxiliary switch to a bell alarm and/or other external circuits for enunciating and/or monitoring the open/closed/tripped status of the electrical switching device. The switch is typically a conventional switch including a normally open status contact and a normally closed status contact. Whenever the separable contacts are closed, the normally closed contact is closed. On the other hand, when the separable contacts are open, the operating mechanism engages the switch in order to open the normally closed contact. An example of a circuit breaker having an auxiliary switch is disclosed in U.S. Pat. No. 5,291,165.

It is known to employ electronic control, such as a computer, in conjunction with a panelboard for controlling and/or monitoring circuit breakers. The electronic control includes an interface for monitoring the circuit breaker status contacts. An example of such electronic control is disclosed in U.S. Pat. No. 4,918,566.

There is a need, therefore, for a simple, low cost device for monitoring the status of electrical switching devices which do not include an external status indication.

SUMMARY OF THE INVENTION

These and other needs are satisfied by the invention which is directed to a monitoring apparatus comprising a plurality of sensing means for interconnection with the load output of a corresponding electrical switching apparatus and for sensing at least one of first and second states of the corresponding electrical switching apparatus and producing a signal at an output; producer means interconnected with the outputs of the sensing means for producing at an output a signal being a function of the signals of the sensing means; and indicating means interconnected with the output of the producer means for indicating the signal of the producer means.

As another aspect of the invention, a monitoring apparatus comprises a plurality of sensing means for interconnection with the load output of a corresponding electrical switching apparatus and for sensing at least one of closed and open states of the corresponding electrical switching apparatus and producing a signal at an output; producer means interconnected with the outputs of the sensing means for producing at an output a signal being in a first state when all of the electrical switching apparatus have one of the closed and open states, and being in a second state when at least one of the electrical switching apparatus has the other of the closed and open states; and indicating means interconnected with the output of the producer means for indicating the signal of the producer means.

As a further aspect of the invention, a panelboard apparatus comprises an enclosure; at least one electrical switching apparatus having a first state and a second state; monitoring means comprising a plurality of sensing means for interconnection with the load output of a corresponding one of the at least one electrical switching apparatus and for sensing at least one of first and second states of the corresponding electrical switching apparatus and producing a signal at an output, producer means interconnected with the outputs of the sensing means for producing at an output a signal being a function of the signals of the sensing means, and indicating means interconnected with the output of the producer means for indicating the signal of the producer means; and holding means for holding in the enclosure at least up to a plurality of electrical switching apparatus including the at least one electrical switching apparatus.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "signal" shall expressly include, but not be limited to any input and/or output utilized for control and/or monitoring such as, for example, analog signals, digital signals, command signals, status signals, discrete signals, serial signals, serial messages, or fiber optic or other light-based signals such as infrared signals.

Figure 1:
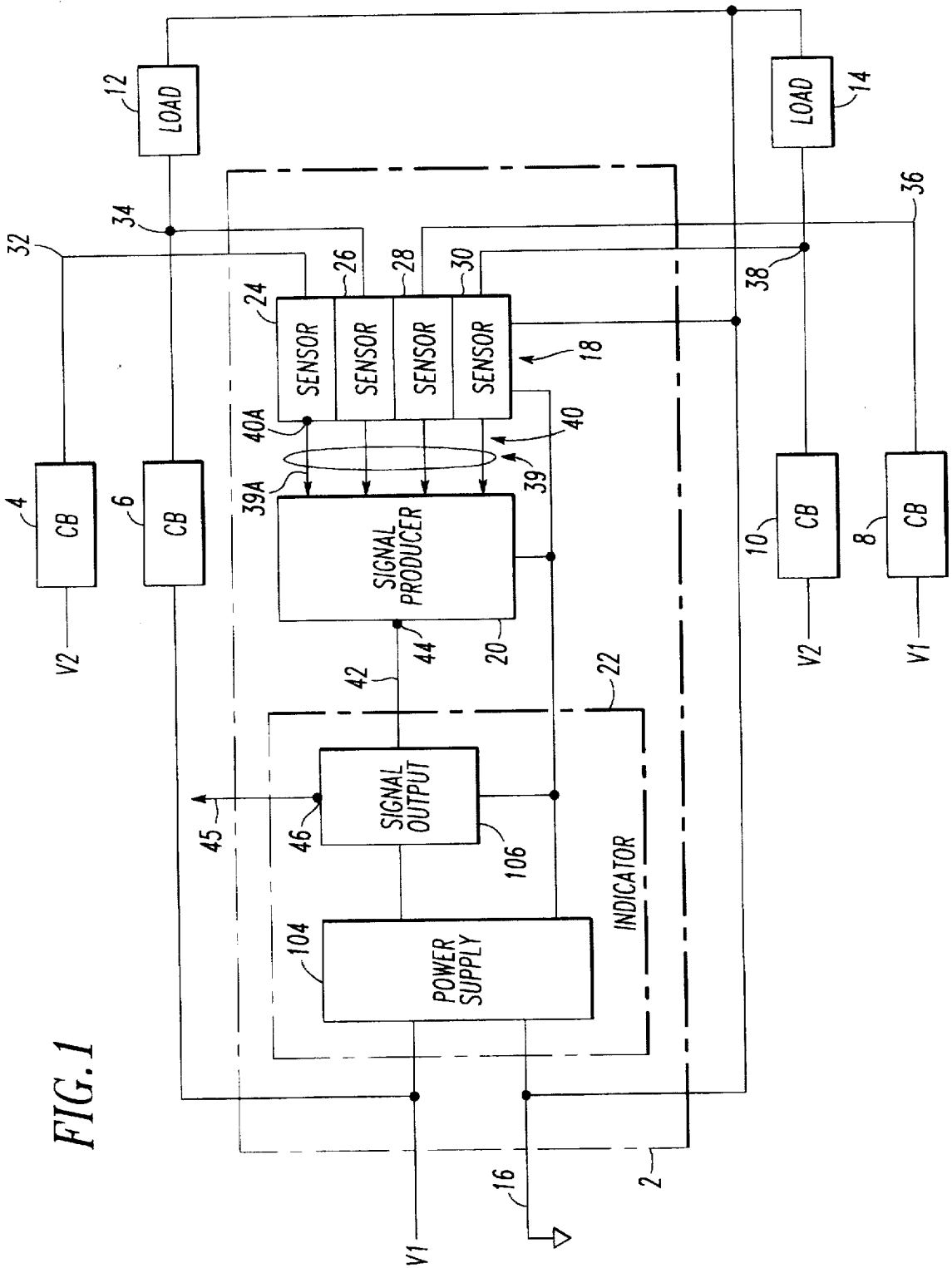
FIG. 1 is a functional block diagram of a monitoring device for circuit breakers in accordance with the invention.

Referring to FIG. 1, a monitoring circuit 2 for monitoring a plurality of electrical switching apparatus, such as conventional circuit breakers (CB) 4,6,8,10, is illustrated. Although four exemplary single-phase circuit breakers 4,6, 8,10 are illustrated, it will be appreciated that the invention is applicable to a wide range of electrical switching apparatus types and/or counts having one, two, three or more phases. The exemplary circuit breakers 6,10 are interconnected between power sources V1,V2 and loads 12,14, respectively, and include a closed state, in which power is connected to the corresponding load, and open and tripped states, in which power is disconnected from such load. The circuit breakers 4,8 are interconnected with respective power sources V2,V1 and are capable of being connected to other loads (not shown). Although two alternating current (AC) power sources V1,V2 are shown, the invention is applicable to one or more AC or direct current (DC) power sources.

A power source, a circuit breaker and a load form a power circuit, such as between power source V1, circuit breaker 6 and load 12, or between power source V2, circuit breaker 10 and load 14. Two of the circuit breakers 4,8 are each available for connection to a load (not shown), and it will be appreciated that each such circuit breaker could be connected to a load similar to loads 12,14. The power sources V1,V2 are referenced to, and the loads 12,14 are connected to, a ground connection, such as neutral 16.

The monitoring circuit 2 includes a sensor circuit 18, a signal producer circuit 20 and an indicator circuit 22. The sensor circuit 18 includes sensors 24,26,28,30 for interconnection with the load outputs 32,34,36,38 of the corresponding circuit breakers 4,6,8, 10, respectively. The sensors 24,26,28,30 sense the closed and open (or tripped) states of the circuit breakers 4,6,8,10, respectively, and produce corresponding closure signals 39 at their outputs 40, such as closure signal 39A at output 40A of sensor 24.

The signal producer circuit 20 is interconnected with the outputs 40 of the sensor circuit 18 and produces a signal 42 at an output 44. The signal 42 is a predefined function of the signals 39 of the sensor circuit 18. Preferably, the signal 42 is in a first logic state when all of the circuit breakers 4,6,8,10 have one of the closed and open (or tripped) states, and is in a second logic state when at least one of the circuit breakers 4,6,8,10 has the other of the closed and open (or tripped) states.

The indicator circuit 22 is interconnected with the output 44 of the signal producer circuit 20 and provides a suitable indication signal 45 at an output 46.

Figure 2:
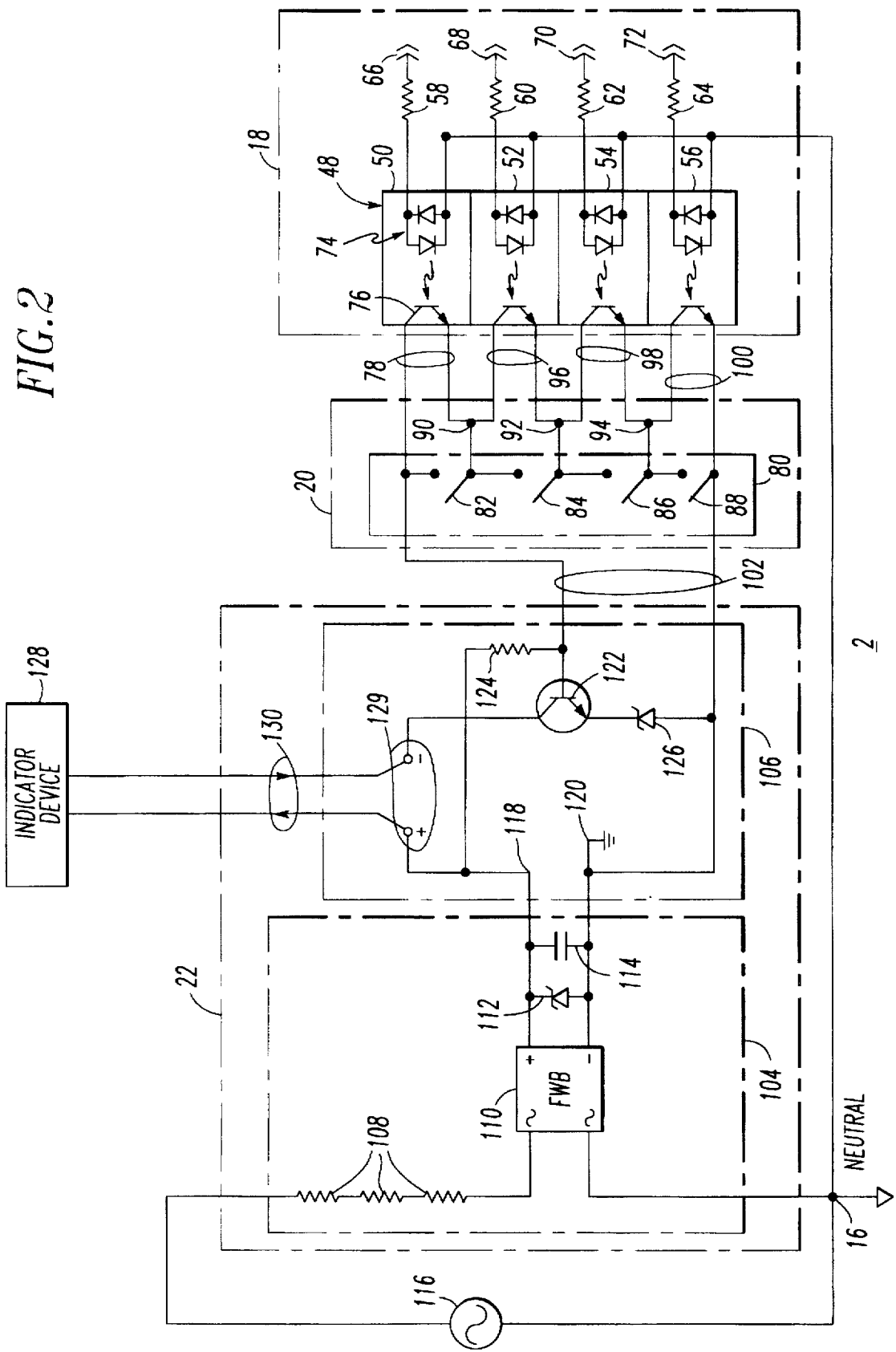
FIG. 2 is schematic diagram of the monitoring device of FIG. 1.

Referring to FIG. 2, a schematic diagram of the exemplary monitoring circuit 2 is illustrated. The exemplary sensor circuit 18 includes integrated circuit 48, such as a PS 2506-4 marketed by NEC. The exemplary integrated circuit 48 has four optical isolators or opto-isolators 50,52,54,56 interconnected with resistors 58,60,62,64 and terminals 66,68,70,72, respectively, for connection with circuit breaker load outputs, such as outputs 32,34,36,38 of FIG. 1. The optical isolators 50,52,54,56 electrically isolate the corresponding circuit breaker from the signal producer circuit 20.

As shown with optical isolator 50, each of the optical isolators 50,52,54,56 includes a pair of input diodes 74, which are suitable for operation with an AC or DC electrical switching device, and a Darlington output transistor 76. Whenever the corresponding circuit breaker (as shown in FIG. 1) is connected to a suitable power source and is in the closed state, sufficient current flows through the resistor 58 and one of the diodes 74, between the terminal 66 and the neutral 16. Then, the output transistor 76 is turned-on by light from one of the diodes 74. On the other hand, when the corresponding circuit breaker is disconnected from a power source or is in the open (or tripped) state, the output transistor 76 is turned-off. For the circuit breaker closed state, the transistor 76 provides a low impedance between the output terminals 78, while in the open (or tripped) state, there is a high impedance between the output terminals 78.

The exemplary signal producer circuit 20 includes a dual-inline-package (DIP) switch 80 having four switches 82,84,86,88, and electrical connections 90,92,94. The outputs 78,96,98,100 of the integrated circuit 48 are connected in series by the connections 90,92,94. The emitter half of the outputs 78,96,98 is connected to the collector half of the outputs 96,98,100 by the connections 90,92,94, respectively. The two terminals of the switches 82,84,86,88 are connected between the collector and emitter halves of the outputs 78,96,98, 100, respectively, and, hence, are connected in parallel with a corresponding one of the transistors of the integrated circuit 48. The switches 82,84,86,88, thereby, may be employed to alternatively drive the respective outputs 78,96,98,100.

As a non-limiting example, the switch 82 may be closed to simulate the closed state of a circuit breaker associated with terminal 66 which is either: (1) not connected to such terminal; (2) open; (3) tripped; and/or (4) not connected to a power source. As a further non-limiting example, the switch 82 may be closed for operation with fewer than four circuit breakers. In this manner, the switches 82,84,86,88 may be closed to change or disable the respective outputs 78,96,98, 100 or may be opened to enable such outputs. In this manner, it is not necessary to use all four of the exemplary optical isolators 50,52,54,56. This facilitates use of the monitoring circuit 2 for one or two circuit breakers with subsequent expansion to three or more electrical switching apparatus. The switches 82,84,86,88 also permit the monitoring of a corresponding circuit breaker to be disabled, thereby precluding the state of such circuit breaker from affecting the indication of the producer circuit 20.

The output 102 of the exemplary signal producer circuit 20 has a low impedance state when all of the circuit breakers have the closed state, and has a high impedance state when any of the circuit breakers has the open (or tripped) state. Although the signal producer circuit 20 provides a low or high impedance signal for a particular combination of circuit breaker states, it will be appreciated that other producer circuits (e.g., digital logic, analog logic, processor logic) are possible for other types of produced digital signals which may be a function of any boolean combination of the circuit breaker states. As a non-limiting example, a high or positive signal could be asserted if X (e.g., X=0 through 4) of the circuit breakers are closed and Y (e.g., Y=4 through 0) of the circuit breakers are open (or tripped), and a low, zero or negative signal could be asserted otherwise. As another non-limiting example, a false signal could be asserted if predetermined circuit breakers (e.g., circuit breakers associated with terminals 66,68) are closed and other predetermined circuit breakers (e.g., circuit breakers associated with terminals 70,72) are open (or tripped), and a true signal could be asserted otherwise. As a further non-limiting example, an analog signal (or a digital signal with a digital value) could be asserted as a function of the count of circuit breakers, associated with terminals 66,68,70,72, which are open (or tripped).

The indicator circuit 22 includes a power supply 104 and a signal output circuit 106. The exemplary AC/DC power supply 104 includes input resistors 108, a full-wave bridge (FWB) 110, an output zener diode 112 and an output capacitor 114, although the invention is applicable to other power supplies, such as a DC/DC power supply. The AC input of FWB 110 is connected by the resistors 108 to an AC power source 116 which is referenced to neutral 16. The pulsating DC output of FWB 110 is regulated by zener diode 112 and filtered by capacitor 114 to provide at node 118 a suitable DC voltage which is referenced to ground 120. The node 118 and ground 120 are interconnected with the signal output circuit 106. The ground 120 also provides a reference for the output 102 of the signal producer circuit 20.

The exemplary signal output circuit 106 includes a transistor 122, a resistor 124 and a zener diode 126. The resistor 124, which is connected between the node 118 and the base of the transistor 122, biases the transistor 122 on when the output 102 is in the high impedance state. In this high impedance state, the voltage at node 118 sufficiently exceeds the combined zener voltage of diode 126 and the base-emitter voltage of transistor 122. In this case, the transistor 122 turns-on, thereby sinking sufficient current which flows through an external indicator device 128. On the other hand, when the output 102 has the low impedance state, the transistor 122 turns-off and zero or negligible current flows through the external indicator device 128.

In this manner, when any of the circuit breakers associated with the terminals 66,68,70,72 are open or tripped (e.g., when the integrated circuit 48 senses a no voltage condition at one or more of the terminals 66,68,70,72), transistor 122 is biased on. This results in a digital signal 130 (e.g., a positive current) being asserted between terminals 129 for communication to the external indicator device 128. The exemplary external indicator device 128 is located within a suitable distance of the terminals 129 and is interconnected therewith by a suitable electrical connection, such as a wire. Otherwise, when all of the circuit breakers associated with the terminals 66,68,70,72 are closed, the appropriate digital signal 130 (e.g., about zero current) is asserted between the terminals 129 for communication to the external indicator device 128.

Figure 3:
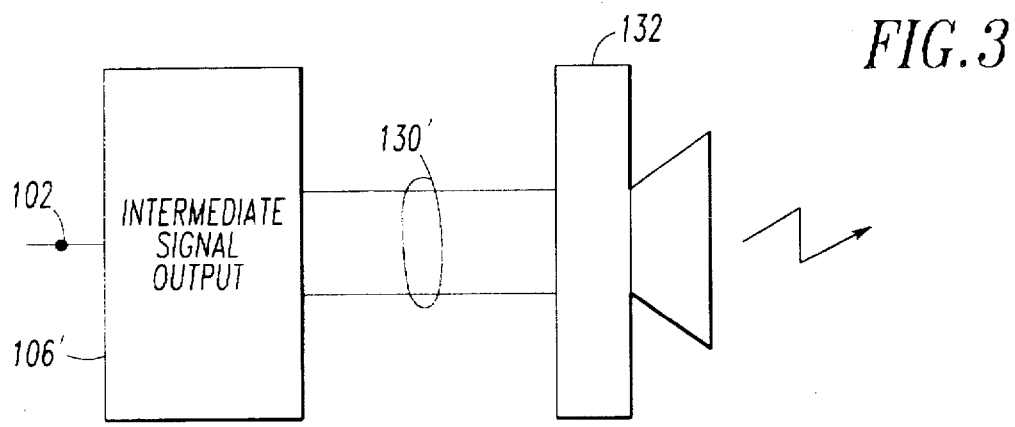
FIG. 3 is a block diagram of an indicating circuit in accordance with an embodiment of the invention.
Figure 4:
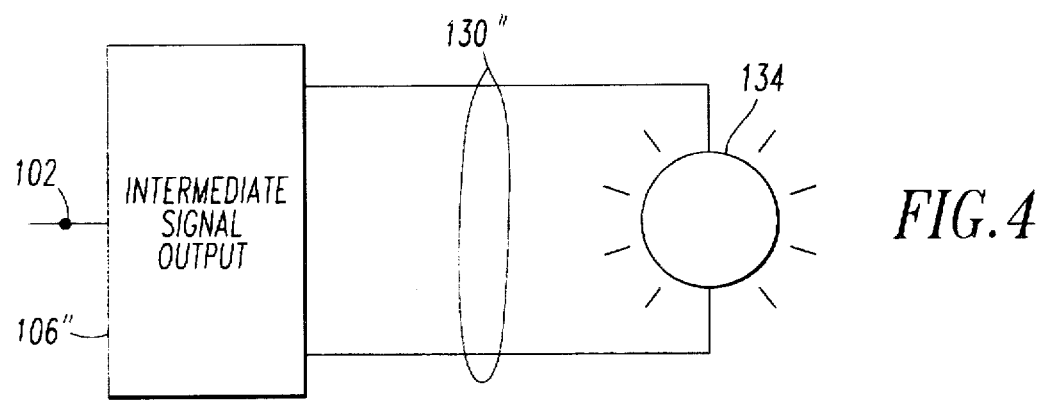
FIG. 4 is a block diagram of an indicating circuit in accordance with another embodiment of the invention.
Figure 5:
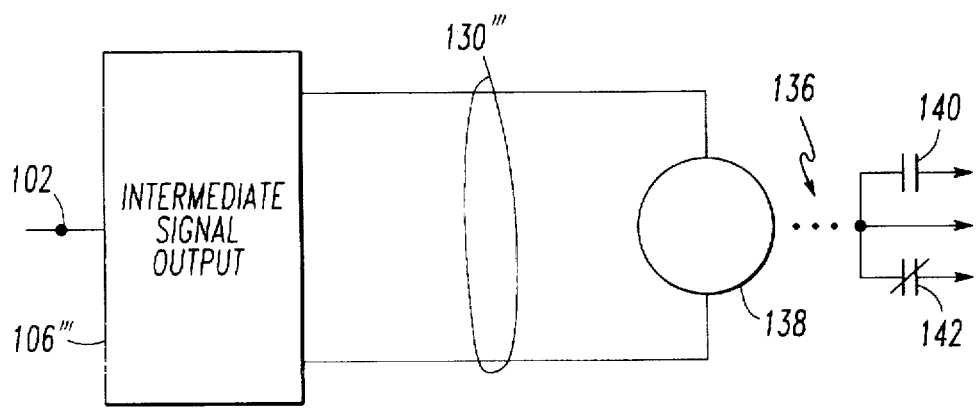
FIG. 5 is a block diagram of an indicating circuit in accordance with a further embodiment of the invention.

Referring to FIGS. 3, 4 and 5, alternative intermediate signal output circuits 106', 106" and 106'" are illustrated for interconnection with exemplary indicator devices 132, 134 and 136, respectively. In FIG. 3, the exemplary sounder 132 produces an audible signal, such as an audible alarm, from the intermediate signal 130', thereby audibly indicating the appropriate state (e.g., true) of the signal 102 of FIG. 2. The exemplary lamp 134 of FIG. 4 produces a visual signal, such as an alarm light, from the intermediate signal 130", thereby visually indicating the appropriate state of the signal 102.

The exemplary relay 136 (e.g., a reed relay) of FIG. 5 includes a coil 138 which, when energized by the intermediate signal 130'", changes the states of normally open separable contact 140 and normally closed separable contact 142. In turn, one or both of the separable contacts 140,142 may be employed by other downstream indicating devices (not shown), such as lights, signals, or alarms. The relay 136 provides compatibility, for example, with an alarm system or a central station, for reporting a trip. Although exemplary audible, visual and digital logic signals have been illustrated, it will be appreciated that the invention is applicable to a wide range of signal types for monitoring and/or control purposes.

Figure 6:
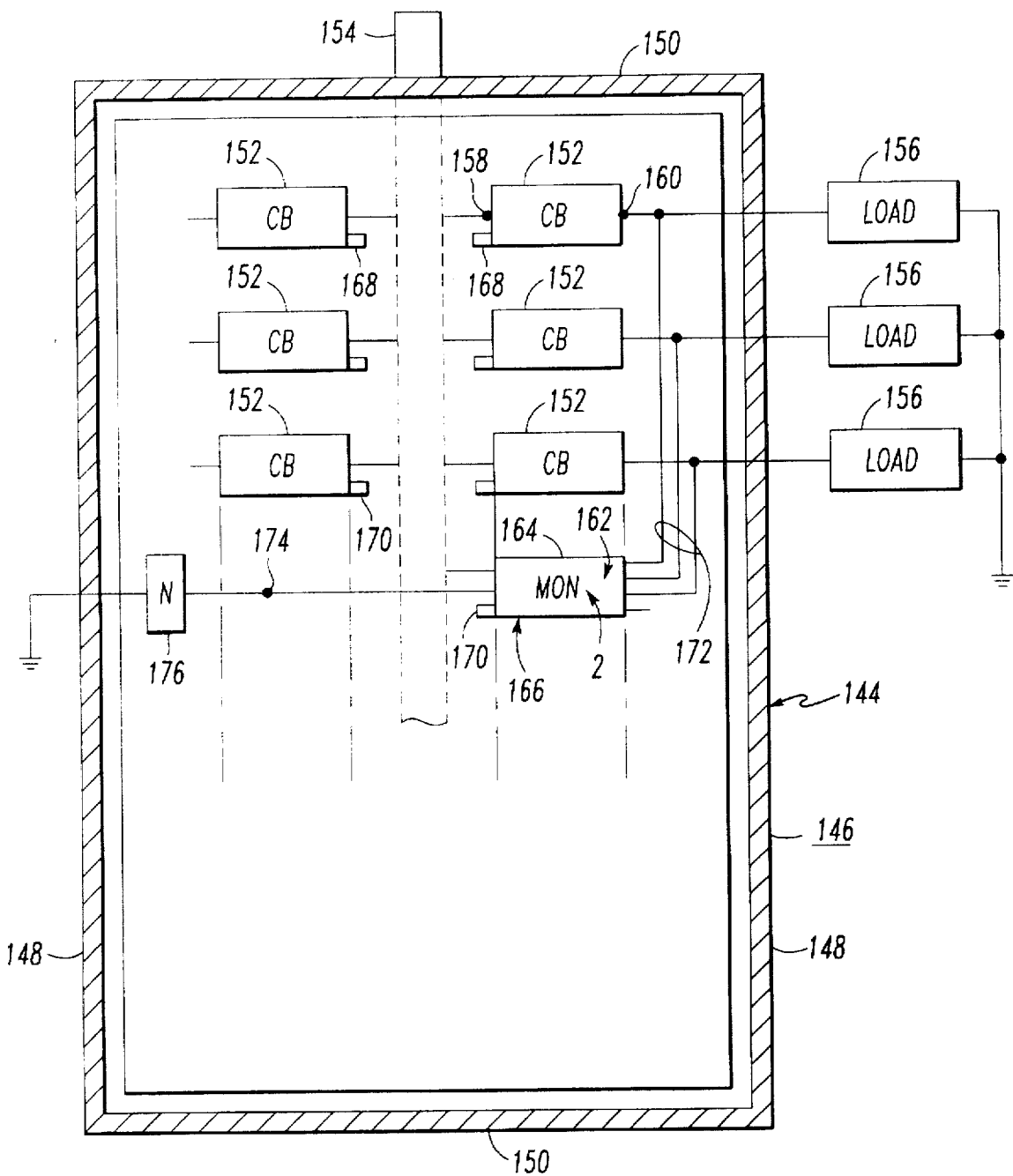
FIG. 6 is a functional block diagram of a panelboard having a plurality of circuit breakers and a monitoring device in accordance with the invention.

Referring to FIG. 6, the monitoring circuit 2 of FIGS. 1-2 is installed in a conventional panelboard 144. The panelboard 144 includes a box or enclosure 146 having opposite sidewalls 148 and end walls 150, and one or more circuit breakers (CB) 152 each of which is connected to a line bus bar 154 and a separate load 156 (as shown with three of the circuit breakers 152). As understood by those skilled in the art, the circuit breakers 152 include a manually operated handle (not shown) for opening and closing separable contacts (not shown) which are disposed between a line input terminal 158 and a load output terminal 160. A trip mechanism (not shown) operates on mechanisms (not shown) within the circuit breakers 152 in a well-known manner for opening the separable contacts thereof.

The monitoring circuit 2 of FIGS. 1-2 is preferably assembled as part of a printed circuit board 162 enclosed within a housing 164, thereby forming a monitor assembly (MON) 166. The panelboard 144 includes a plurality of holders, such as the exemplary stabs 168, for holding (e.g., by friction or other suitable retention mechanism) in the enclosure 146 one or more of the circuit breakers 152, and stabs 170 for holding the housing 164 and for alternatively holding the circuit breakers 152. Preferably, the housing 164 is either the same or similar to the housings of the circuit breakers 152 in order that the stabs 168,170 are identical. As shown in FIG. 6, the exemplary count (e.g., 4) of the sensors 24,26,28,30 of FIG. 1 may be greater than the count (e.g., 3) of the monitored circuit breakers 152, although a wide range of counts are possible.

The monitor assembly 166 preferably installs like a conventional circuit breaker, except that the wiring or electrical connections 172 to the load output terminals 160 of the monitored circuit breakers 152 (from the terminals 66,68, 70,72 of FIG. 2) are made first and then the assembly 166 is engaged with the stab 170. Also, an electrical connection 174 is made to an exemplary neutral bar (N) 176 in a similar manner as the corresponding connection in a GFCI (not shown), although the invention is applicable to panelboards having one or more fixed or movable neutral or ground connections associated therewith.

The exemplary low cost monitoring circuit 2 and monitor assembly 166 indicate the switching off (or tripping) of any combination of up to four electrical switching apparatus used in critical and/or unsupervised applications. Non-limiting examples include monitoring of electrical switching apparatus for sump pumps, well pumps, electric heaters, water pipe heat tapes, poultry houses, and commercial and residential freezers. The circuit 2 and assembly 166 check for voltage loss at the load output terminals 32,34,36,38,160. In this manner, the assembly 166 may be used in new construction as well as in existing load centers. Furthermore, indication is independent of any load being connected to the load output terminals 32,34,36,38,160. In the embodiment of FIG. 6, single, double, or three-pole common-trip breakers may be monitored, using only one pole space in the panelboard 144.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A monitoring apparatus for monitoring a plurality of electrical switching apparatus having a closed state and an open state, said electrical switching apparatus having a load output, said monitoring apparatus comprising:

a plurality of sensing means for interconnection with the load output of corresponding ones of said electrical switching apparatus, each of said sensing means for sensing at least one of the closed and open states of the corresponding electrical switching apparatus and producing a signal at an output, and each of said sensing means including a transistor means for driving the output thereof;

producer means interconnected with the outputs of said sensing means for producing a signal at an output, said producer means including plural switch means each of which is in parallel with a corresponding one of said transistor means for alternatively driving the output thereof, said signal of said producer means being in a first state when all of said electrical switching apparatus have one of the closed and open states, and being in a second state when at least one of said electrical switching apparatus has the other of the closed and open states; and indicating means interconnected with the output of said producer means for indicating said signal of said producer means.

2. The monitoring apparatus as recited in claim 1 wherein one of said transistor means is turned-on for the closed state of the corresponding electrical switching apparatus; and wherein said switch means in parallel with the corresponding transistor means is closed to simulate the closed state of the corresponding electrical switching apparatus.

3. The monitoring apparatus as recited in claim 1 wherein said indicating means is a means for audibly indicating said signal of said producer means.

4. The monitoring apparatus as recited in claim 1 wherein said indicating means is a means for visually indicating said signal of said producer means.

5. The monitoring apparatus as recited in claim 1 wherein said indicating means includes relay means for outputting at least one separable contact.

6. The monitoring apparatus as recited in claim 1 wherein said indicating means includes means for outputting a digital signal.

7. The monitoring apparatus as recited in claim 1 wherein said electrical switching apparatus is a circuit breaker having at least one phase.

8. The monitoring apparatus as recited in claim 1 wherein said signal of said producer means is in the first state when all of said electrical switching apparatus have the closed state, and is in the second state when at least one of said electrical switching apparatus has the open state.

* * * * *